United States Patent
vor dem Esche et al.

(10) Patent No.: US 10,186,899 B2
(45) Date of Patent: Jan. 22, 2019

(54) ENERGY STORAGE MODULE WITH DC VOLTAGE INTERMEDIATE CIRCUIT

(71) Applicant: ENRICHMENT TECHNOLOGY COMPANY LTD., Jülich (DE)

(72) Inventors: Ing. Rainer vor dem Esche, Heinsberg (DE); Christoph Schäfer, Aachen (DE); Ing. Christoph Treppmann, Aachen (DE)

(73) Assignee: ENRICHMENT TECHNOLOGY COMPANY LTD. (DE)

( * ) Notice: Subject to any disclaimer, the term of this patent is extended or adjusted under 35 U.S.C. 154(b) by 659 days.

(21) Appl. No.: 14/430,467

(22) PCT Filed: Sep. 10, 2013

(86) PCT No.: PCT/EP2013/068724
§ 371 (c)(1),
(2) Date: Jun. 17, 2015

(87) PCT Pub. No.: WO2014/048727
PCT Pub. Date: Apr. 3, 2014

(65) Prior Publication Data
US 2015/0311751 A1 Oct. 29, 2015

(30) Foreign Application Priority Data
Sep. 28, 2012 (EP) .................... 12186479

(51) Int. Cl.
*H02J 7/00* (2006.01)
*H02J 9/00* (2006.01)
(Continued)

(52) U.S. Cl.
CPC ...... *H02J 9/08* (2013.01); *H02J 3/30* (2013.01); *H02J 15/00* (2013.01); *Y02E 60/16* (2013.01); *Y02P 90/50* (2015.11)

(58) Field of Classification Search
CPC ...... H02J 9/08; H02J 15/00; H02J 3/30; Y02E 60/16; Y02P 90/50
(Continued)

(56) References Cited

U.S. PATENT DOCUMENTS 4,879,625 A * 11/1989 Potenzone ............. H02H 3/207
307/130
7,400,052 B1    7/2008 Badger
(Continued)

OTHER PUBLICATIONS

International Search Report for corresponding PCT/EP2013/068724, filed Sep. 10, 2013, dated Aug. 27, 2014 by Wenyan Zeng.
(Continued)

*Primary Examiner* — Richard Tan
(74) *Attorney, Agent, or Firm* — Tarolli, Sundheim, Covell & Tummino LLP

(57) ABSTRACT

An energy storage module is provided for reversibly storing electrical energy in the form of mechanical rotation energy. The energy storage module comprises a plurality of flywheel storage units, at least one control system and at least one module control unit, wherein the flywheel storage units are connected electrically in parallel by means of a common DC voltage intermediate circuit, and the control system or systems is/are connected to the common DC voltage intermediate circuit by way of the respective output side and to at least one external voltage grid by way of the respective input side, wherein the module control unit is provided for transmitting suitable prespecified torques to the flywheel storage units for emitting or absorbing energy to/from the DC voltage intermediate circuit, and at least one of the control systems is designed to control the DC voltage in the DC voltage intermediate circuit.

24 Claims, 4 Drawing Sheets

Figure 1:
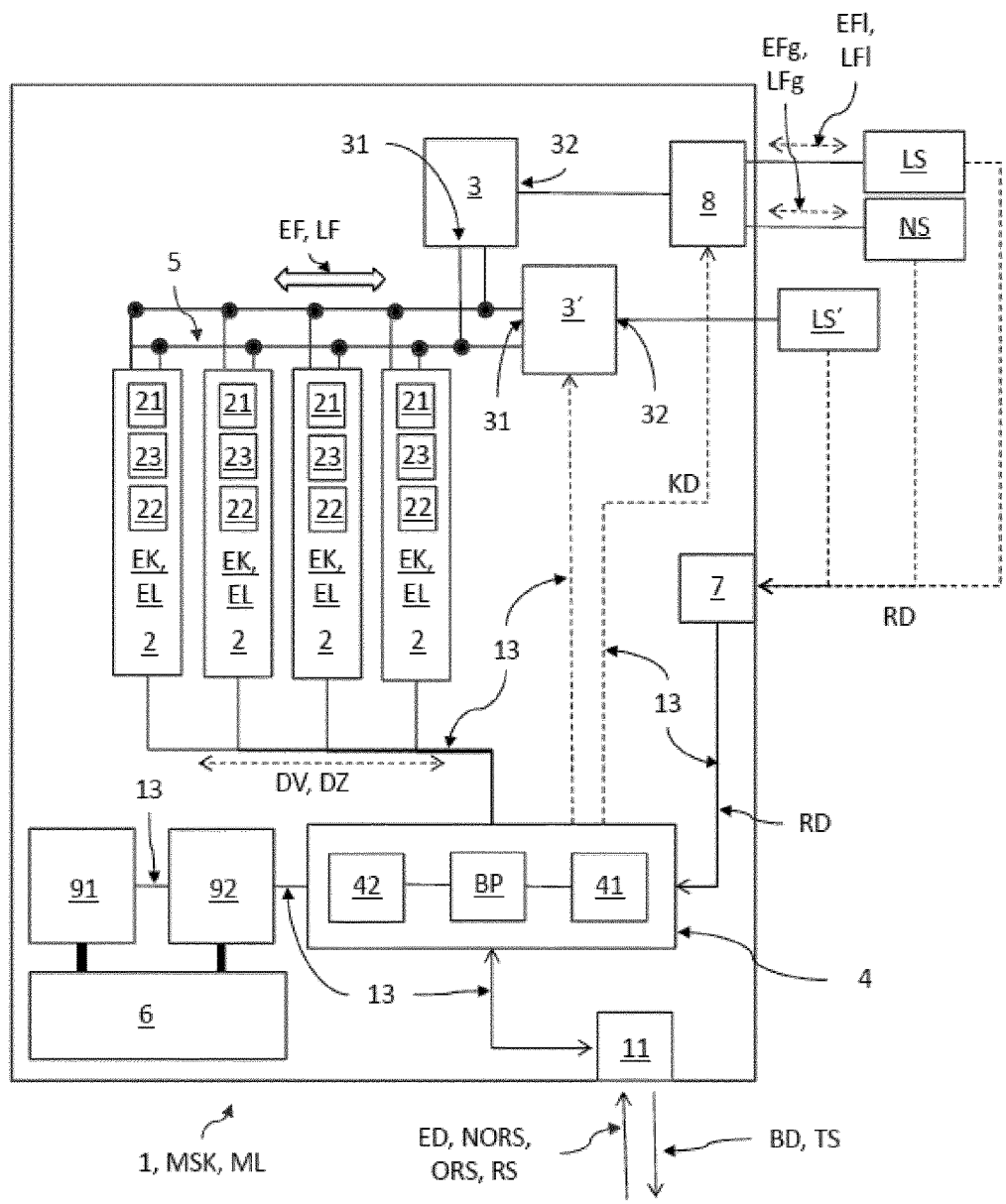

(51) Int. Cl.
*H02J 9/08* (2006.01)
*H02J 3/30* (2006.01)
*H02J 15/00* (2006.01)

(58) Field of Classification Search
USPC .......................................................... 307/65
See application file for complete search history.

(56) References Cited

U.S. PATENT DOCUMENTS

| | | | |
|---|---|---|---|
| 2005/0077881 A1* | 4/2005 | Capp ........................ | H02J 3/30 |
| | | | 322/29 |
| 2010/0038907 A1* | 2/2010 | Hunt ................... | E21B 41/0085 |
| | | | 290/7 |
| 2012/0187922 A1 | 7/2012 | Dubois et al. | |
| 2013/0123989 A1* | 5/2013 | Krolak ................... | H02P 27/08 |
| | | | 700/275 |

OTHER PUBLICATIONS

Boyes et al.: "*Technologies for Energy Storage Flywheels and Super Conducting Magnetic Energy Storage*"; Power Engineering Society Summer Meeting, 2000. IEEE Jul. 16-20, 2000, Piscatawa, NJ, USA, IEEE, vol. 3, Jan. 1, 2000, pp. 1548-1550, XP010511259; DOI: 10.1109/PESS.2000.868760; ISBN: 978-0-7803-6420-2 (p. 1548-1549, paragraph 2).

XP000026964: "*Dynamischer Speicher Fur Hohe Kurzzeitenergien*"; ELektrotechnik Fuer Die Automatisierung, Vogel Business Media GmbH & Co. KG. vol. 70, No. 16, Sep. 30, 1988, p. 14/15, ISSN: 1431-9578 (whole document).

\* cited by examiner

ENERGY STORAGE MODULE WITH DC VOLTAGE INTERMEDIATE CIRCUIT

RELATED APPLICATIONS

The present invention is a U.S. National Stage under 35 USC 371 patent application, claiming priority to Serial No. PCT/EP2013/068724, filed on 10 Sep. 2013; which claims priority from EP 12186479.7, filed 28 Sep. 2012, the entirety of both of which are incorporated herein by reference.

FIELD OF THE INVENTION

The invention relates to an energy storage module with DC voltage intermediate circuit and to a method for controlling such an energy storage module.

BACKGROUND OF THE INVENTION

The energy for operating a power supply system is supplied by various different types of power plants. Most of the power plants, such as, for example, nuclear power plants, coal-fired power plants, gas-fired power plants, wind energy plants, biogas plants or solar power plants, are hereby only energy generators for feeding energy into to non-local power supply systems. Non-local power supply systems are transmission networks, for example, such as operated in Germany, for example, by Amprion, 50 Hertz, Tennet and TransnetEnBW. These transmission networks are part of the European grid. As pure energy generators, the above-mentioned power plants cannot absorb and store any excess energy from the power supply system, if required. In contrast, energy storages can be used to absorb and emit energy to a power supply system. Energy storages are, for example, central energy storages, such as pumped storage plants or decentralized energy storages, such as batteries or flywheel storages, for example. The pumped storage plants represent energy storages, which are largely independent on the weather and which are thus on principle always available. Central energy storages are generally designed for a large capacity. To provide control energy for the non-local power supply systems, they are suitable for displaying a corresponding effect in the non-local power supply systems due to the available output. Depending on the overall size, pumped storage power plants can have an output of several 100 MW and more, wherein the generators, however, are mostly designed to produce electricity under full load and are thus able to promptly use the entire output of the pumped storage plant with a corresponding efficiency. This mode of operation is not suitable to stabilize or to improve an electricity demand, which is rather negligible as compared to the capacity of the pumped storage power plant.

Centrally used battery-storage systems are being designed with the goal of realizing a pilot operation for grid-stabilizing (localized) tasks (control energy). The ones planned to date, however, do not fulfill any localized tasks. However, due to their immanent correlations between output, capacity and deterioration, battery storages are, on principle, not well suited for such applications with a plurality of load cycles per day and degrade quickly due to temperature influences, system failures and operating errors. Battery storages are thus very maintenance-intensive. Due to their high fire and chemical risk, battery storages also represent a danger to the environment and/or water, which require an enormous protection effort.

On principle, decentralized energy storages are optimized for the stabilization of the local power requirement and are not designed and qualified for supplying control energy to support the non-local power supply system. Such plants cannot contribute in meeting the demand of all power supply systems. An interconnection of the decentralized storages to form a non-local and locally acting plant does not currently take place.

It would thus be desirable to have an energy storage, which is effective, environmentally safe and which can be operated easily, comprising a large capacity, which makes it possible to be able to simultaneously attain an improvement of local grid quality and the supply guarantee for non-local power supply systems, as required, and which can thus be operated as energy storage system with a sufficient effect for both purposes.

SUMMARY OF THE INVENTION

It is an object of the invention to have an energy storage, which is effective, environmentally safe and which can be operated easily, comprising a large capacity, which makes it possible to be able to simultaneously attain an improvement of local grid quality and the supply guarantee for non-local power supply systems, and which can thus be operated as energy storage system with a sufficient effect for both purposes.

This task is solved by means of an energy storage module for reversibly storing electrical energy in the form of mechanical rotation energy, comprising a plurality of flywheel storage units, at least one control system and at least one module control unit, wherein the flywheel storage units are connected electrically in parallel by means of a common DC voltage intermediate circuit and the control system is connected to the DC voltage intermediate circuit by way of the respective output side and to at least one external voltage grid by way of the respective input side, wherein the module control unit is provided for transmitting suitable prespecified torques to the flywheel storage units for emitting or absorbing energy to/from the DC voltage intermediate circuit, and at least one of the control systems is designed to control the DC voltage in the DC voltage intermediate circuit such that the DC voltage remains substantially constant between an upper threshold value and a lower threshold value when energy is emitted into the external voltage grid or systems and when energy is absorbed from the external voltage grid or systems.

By using flywheel storage units, the energy is stored in the form of mechanical rotation energy. This form of energy storage does not require any chemical and/or easily combustible substances, so that such storages do not pose a danger to the environment and water. Due to the fact that the flywheel storage units are connected electrically in parallel to a DC voltage intermediate circuit, a common module storage capacity and a common module output for the energy storage module can be added together in a simple manner from the individual unit capacities and energy outputs of the respective flywheel storage units. Due to the fact that, on principle, any number of flywheel storage units can be connected electrically in parallel to the DC voltage intermediate circuit, the module capacity and module output can be adapted to the demand and can, on principle, be scaled arbitrarily. An energy storage, which has a large capacity, which, in addition to improving the local grid quality in local power supply systems (for example AC grids) makes it possible to be able to also attain the supply guarantee for non-local power supply systems (for example AC grids), is thus provided. By using DC voltage in the common DC voltage intermediate circuit, the control-related effort also becomes smaller, a synchronization, for example, is not necessary. Using only a large power supply inverter as control system also results in smaller losses than in response to using a plurality of small power supply inverters, for example if all flywheel storage units were connected separately to a power supply system by way of their own power supply inverters. The use of only one large power supply inverter is furthermore more cost-efficient as compared to the use of a plurality of smaller power supply inverters. The energy storage module according to the invention as energy storage can thus be operated for both purposes with a sufficient effect. The energy storage module can furthermore be operated very effectively, because the provided module storage capacity and module output can be adapted to the respective demands by suitably selecting the number of flywheel storage units, which are connected to the DC voltage intermediate circuit, and because unused excess capacities can thus be avoided. The control of the DC voltage intermediate circuit to a nominal DC voltage can also be realized easily, which simplifies the total control of the energy storage module. In addition, an error redundancy, which prevents that, due to the malfunction of a flywheel storage unit, the availability of the energy storage module for its control and systems tasks is significantly impacted in the connected external power supply systems (for example AC grids), is furthermore attained by means of the electrically parallel arrangement of the flywheel storage units. The nominal DC voltage thereby depends on the connected external power supply systems and on the components used in the energy storage module. A technically sensible area for the intermediate circuit voltage when connecting the system to a low voltage system lies between 550V and 1000V, for example. The lower limit is defined substantially by the voltage level of the low voltage system, whereas the upper limit is determined substantially by the technical characteristics of the components used in the energy storage module. For technical and economic reasons, the nominal DC voltage for medium voltage systems or DC voltage systems in the intermediate circuit can also have other values, which are orientated on the voltage level of these systems. In an exemplary embodiment, the nominal DC voltage in the DC voltage intermediate circuit is 750 V±5 V.

The energy storage module according to the invention represents energy storages, which can be used variably at arbitrary locations and which can be used quickly with little effort. The energy storage module is thereby designed to be connected to an external voltage grid as a local or non-local system or, in response to a suitable embodiment of the control system, also to more than one external voltage grids, for example to one or more local systems and/or a non-local systems, via the control system. The emission of energy into the external voltage grid or systems or the absorption of energy from the external voltage grid or systems takes place due to the prespecified torques by means of the module control unit. These torque prespecifications are thereby based on control and system tasks. The control and system tasks are thereby divided into localized control and system tasks for local power supply systems and into non-localized control and system tasks in non-local power supply systems. For executing the non-localized and localized control and system tasks, the energy storage module can hereby either be connected directly to a non-localized power supply system and to one or more local power supply systems, or can be connected indirectly to a non-localized power supply system via a connected local power supply system, provided that the local power supply system itself is connected to the non-localized power supply system.

The energy storage module according to the invention or the flywheel storage units, respectively, are thus not an emergency power supply, which emit energy to a load only when the primary energy supply is interrupted. Instead, energy for controlling the connected power supply system is absorbed from the connected power supply systems (for primary supply of other system participants) or energy is fed exactly into these systems. In the instant invention, the operation of the energy storage module by means of the flywheel storage units is also not limited to the time intervals, in which a different system supplier is not present, but is designed for a permanent improvement of local grid quality and supply guarantee for non-local power supply systems. In particular, the flywheel storage units emit energy into the DC voltage supply intermediate circuit, if the intermediate circuit voltage falls below a certain value. This can also take place, when the connected power supply system is still connected to all of the primary suppliers.

The module control unit makes it possible for the energy storage module to be able to perform different control and system tasks in local and non-local power supply systems, which are connected separately, if applicable, and can thus effect a simultaneous improvement of local grid quality in the local power supply systems and supply guarantee in non-local power supply systems. Localized control and system tasks thereby refer to local power supply systems (for example local AC grids) and are, for example, the ensuring of the required line voltage, the idle power compensation by controlling the amplitude and phase position of the voltage signal, the provision of a local power reserve for larger electricity consumers, which might join, or start-up peaks and the storage of local excess energy quantities. Non-localized control and system tasks thereby refer to non-localized power supply systems (non-local AC grids) and are, for example, the provision of primary or secondary control power. The control power (also reserve power) ensures the system stability in response to unforeseen incidents in the power supply system. For this purpose, power adaptations can be carried out on short notice in the case of controllable power plants and quick-start power plants or energy storages, such as the energy storage module according to the invention, can be used. Further non-localized control and system tasks are also the black start support in the event of a power failure, the general storage of power peaks and the idle power compensation in the non-local power supply system. Further localized and non-localized control and system tasks for local and non-local power supply systems are the provision of redundancies (failure safety) in response to the power supply in combination with the energy suppliers, which are already present, and an idle power management.

The non-local power supply system hereby denotes an AC grid, which extends nationwide across very large areas and in which the non-localized control and system tasks are performed. Non-local power supply systems are power or distribution grids, for example (public power supply system). The public power supply system in Germany is comprised of four transmission networks, for example, which are operated by the system operators Amprion, 50 Hertz, Tennet and TransnetzEnBW. These four power grids together form the energy suppliers' network for Germany. This includes regional distribution grids. In other countries, corresponding transmission networks are operated by other system operators. The frequency of the power supply system is held so as to be stable in the transmission networks (frequency control). The higher European grid of the respective power grids in the individual states is to also be considered as a non-local power supply system, for which, however, only the standards for the control energy are currently determined. The non-localized control and system tasks are performed in the respective power grids. For example, an AC grid, in which the above-described localized control and system tasks are performed, is also identified as local power supply system in terms of the invention. On principle, local power supply systems are spatially limited, for example an in-house power supply system at an industrial installation or a power supply system within a home or group of buildings.

The control system thereby controls the energy flow between one or more connected external voltage systems (local power supply system and/or non-local power supply system) and the flywheel storage units of the energy storage module. The control system thereby controls the DC voltage of the intermediate circuit substantially constantly to a nominal DC voltage, for example 750 V. The expression "substantially constantly" means that the DC voltage can indeed fluctuate temporarily within permissible tolerances, for example ±5 V, wherein the control system always controls such that the actually present DC voltage of the intermediate circuit corresponds to the nominal DC voltage in the ideal case. However, the tolerance range can also be larger than the above-specified values. The control system handles this control in that it uses the external voltage grid or the external voltage grids, depending on the power flow direction, as inexhaustible current source (charging the flywheel storage units with energy) or as drain for the excess energy in the DC voltage intermediate circuit, respectively. For this purpose, suitable control systems comprise one or more power supply inverters or step-up/step-down converters.

If the local and non-local power supply systems were only connected to the energy storage module in a common connection, the energy fed by the energy storage module would only be fed into the external power supply system, which has the larger energy demand (lower internal resistance). However, localized and non-localized control and system tasks might possibly no longer be performed in a well-directed manner according to a task distribution. The control system controls the energy flow to the connected external voltage grids in the manner provided by the module control unit. In a preferred embodiment, the control system is also provided to disconnect one or more of the connected external voltage grid from the energy storage module, if required. If one of the connected external voltage grids should fail, the control system possibly disconnects this external voltage grid from the energy storage module immediately within a few milliseconds, so that said energy storage module still remains operational for the other external voltage grids and the internal voltage supply. Otherwise, a short-circuit or an overload situation might arise. For this purpose, the energy storage module in a further embodiment comprises a control box comprising at least one controlling element and one or more disconnectors, which are controlled by the controlling element and the number of which depends on the number of the external voltage grids connected to the control unit. The control box is thereby directly connected to the module control unit or by way of the control system via a data line, via which the module control unit can transmit configuration data of the control function to the controlling element.

In addition to the control system, which keeps the DC voltage in the DC voltage intermediate circuit constant between the upper and lower threshold values (original control system), one or more control system(s) (additional control system(s) are connected in parallel to the DC voltage intermediate circuit in an embodiment. For example, this or these additional control system or systems can connect a further external voltage grid to the DC voltage intermediate circuit in the same manner as the original control system. This has the advantage that the original control system can maintain and execute the connection conditions (grid codes) of an external voltage grid without limitations, while a second control system can execute grid codes (other external voltage grid), which differ from this, for example.

The functional unit comprising a rotor as flywheel mass, via the rotation of which the energy is stored in the form of mechanical rotation energy, comprising bearing and motor components for accelerating, braking and rotating the rotor in response to a certain speed, comprising an electromagnetic transducer for converting electrical into mechanical energy and vice versa and comprising terminals to other modules, such as, for example, the vacuum module or an internal power supply for the modules, is hereby identified as flywheel storage unit. Depending on charge state, rotors of flywheel storage units can also rotate at speeds of 5000 revolutions per minute. A typical rpm range lies between 15000 revolutions per minute and the maximum speed. The individual flywheel storage units have a unit capacity and unit output, which are a function of the operating conditions, such as, for example, the speed of the rotor and the design of the electromagnetic transducer. For example, the unit capacity can be approximately 5 kWh and the unit output can be between 20 and 200 kW. The storing of the energy in the form of rotation energy is reversible, because, depending on the demand, the energy stored as rotation energy can be removed from the flywheel storage units again and can be fed into an external power supply system as electrical energy via the DC voltage intermediate circuit and the control system and vice versa.

Flywheel energy storages have the advantage that they can provide the quantities of energy, which are to be absorbed or emitted, for the consumers in a highly variable and accurate manner and store this energy in the form of mechanical energy. Flywheel energy storages thus represent a significantly lower risk potential in case of a fire than, for example, a larger accumulation of batteries, interconnected as battery energy storage system or hydrogen storage system comprising hydrogen tanks comprising the combustible hydrogen as risk potential. Flywheel storage units thus represent a more environmentally safe technology for providing energy as compared to other storage technologies and are well suited for any number of charge cycles each day. When providing energy or providing power, one refers to negative energy provision (flow) or negative power provision (flow), if energy or power is absorbed from the external voltage grid and/or the DC voltage intermediate circuit and is stored in the flywheel storage units in the form of mechanical rotation energy. Accordingly, one speaks of positive energy provision (flow) or power provision (flow), when the energy or power, which is stored in the form of mechanical rotation energy, is fed into the external voltage grid and/or the DC voltage intermediate circuit as electrical energy or power from the flywheel storage units by means of braking the flywheels (or rotors). The ability of flywheel storages of being able to provide energy within a few milliseconds is hereby just as advantageous as the ability of being able to supply the specified power for a time period of several minutes. In response to a speed of, for example, 50000 revolutions per minute, a flywheel storage unit can absorb or emit a power of, for example, up to 30 kW-200 kW, depending on the design. In an embodiment, the number of the flywheel storage units in the flywheel module is adapted to provide a module storage capacity for the energy storage module, which is at least sufficient for being able to feed nominal current into a non-local AC grid (power supply system) for a period of more than 30 s.

The module control unit is a component in the energy storage module, which control the energy storage module, that is, which adjusts the desired operating states and operating parameters and which controls the energy storage module according to an operating plan, which includes the desired operating states as function of the time. The localized and non-localized control and system tasks form the basis for the operating plan. For controlling the energy storage module, the module control unit is connected to the respective components in the energy storage module, comprising the control system and the flywheel storage units via suitable data lines, for example a data bus system, such as, for example, a CANbus, a Profibus or as Ethernet.

In an embodiment, the module control unit is provided for the time-related generation and transmission of the prespecified torques for the flywheel storage units, whereupon the flywheel storage units feed or remove current into the DC voltage intermediate circuit as a result of the time-related prespecified torques. A power flow into the energy storage module or out of it results due to the combination with the DC voltage control.

In an embodiment, each flywheel storage unit obtains individual prespecified torques from the module control unit. In the case of individual preselected torques, the respective storage state of the flywheel storage units can be reacted to, so that flywheel storage units, which are already full or virtually full, do not have to absorb any further energy to protect against excess charging or so that flywheel storage units, which are charged only slightly, are not discharged too much to a speed, which is disadvantageous for the operation of the flywheel storage units.

In an embodiment, each flywheel storage unit comprises an electromechanical transducer, which is connected electrically to the DC voltage intermediate circuit via a motor control. Preferably, the motor control is a frequency converter. The electromagnetic transducer will also be identified as motor hereinbelow. The motor control is connected to the module control unit via data lines for obtaining prespecified desired values (for example prespecified torques) and can thereby obtain arbitrary power inputs from the DC voltage intermediate circuit (charging, absorb energy) or emit them to the DC voltage intermediate circuit (discharge, emit energy). All of the components of the DC voltage intermediate circuit are thereby designed such that a mutual influence, such as, for example, a short-circuit or a surge of the DC voltage intermediate circuit, is impossible.

In a further embodiment, the motor controls of all of the flywheel storage units are provided for monitoring the DC voltage in the DC voltage intermediate circuit continuously against the upper threshold value and to independently prevent any power flow from the flywheel storage units into the DC voltage intermediate circuit no later than when the upper threshold value has been exceeded. In spite of the control to a DC voltage in the DC voltage intermediate circuit, which is as constant as possible, a short-term high quantity of energy, which is fed into an AC grid from other sources outside of the energy storage module, a DC voltage in the DC voltage intermediate circuit, which is too high, can occur, for example, due to special external grid states (breakdowns). In response to control and system tasks, which were only just performed, which would lead to a feeding of energy from the energy storage module into the external power supply system, the DC voltage in the DC voltage intermediate circuit would possibly rise above a critical voltage level, if the connected external grid or grids were not able to take over this energy as drain as under normal conditions, because they themselves represent an energy source. To protect the system, the motor controls of the individual flywheel storage units interrupt (suppress) the feeding of energy independently independent from the control and system tasks at hand. The suppression of any power flow from the flywheel storage units into the DC voltage intermediate circuit can also take place without exceeding the upper threshold value when the DC voltage approaches the upper threshold value too closely, for example if the difference between DC voltage in DC voltage intermediate circuit and upper threshold value falls below a critical value defined in the motor control.

In a further embodiment, the module control unit recalls current speeds of the individual flywheel storage units from the motor controls thereof and determines a respective current charge state of the individual flywheel storage units from the recalled speed. The possible speeds can vary between a maximum and a minimum speed (no rotation in the extreme case), wherein the charge state at maximum speed is 100%. The current charge state thus follows from the respective current speed. With the knowledge of the current charge states, the module control unit can use exactly the available quantity of energy and power for feeding into the external voltage grid or systems or the free storage capacity, respectively, for additional quantities of energy, which are to be absorbed, from the external voltage grid or systems for performing the control and system tasks for the respective (individual) preselected torques as basis and can thus suitably adapt the preselected torques to the respective charge state of the individual flywheel storage units. The recall of the speeds can thereby take place periodically, for example at a frequency of 1 Hz. The current speed can thereby take place as reaction to a corresponding active recall signal, emitted by the module control unit or can take place independently by the motor controls (passive recall by the module control unit). The independent transmission by the motor control can take place continuously or only after a change of the speed by a previously determined value. A typical speed range during normal operation is 300 Hz-800 Hz with ±5% as permissible tolerance range, for example.

In an embodiment, an upper speed limitation and/or a lower speed limitation are implemented in the motor control of the flywheel storage units. This speed limitation, which is present on location (in the flywheel storage units) serves to protect the machine against an excess charging of the flywheel storage unit or as total discharge protection. In a preferred embodiment, the upper speed limitation and/or lower speed limitation is implemented by means of a component, for example a microcontroller. However, the speed limitation can also be implemented by means of a software program in the motor control. A so-called hardware installation by the additional component guarantees the operational reliability of the speed limitations independent from the functional state of the motor control. Limits for maximum torques or current inputs, respectively, into or from the DC voltage intermediate circuit are provided in the motor control in the same manner on the hardware side by means of suitable measures.

In a further embodiment, upper speed limitations and/or lower speed limitations are implemented in the module control unit for the preselected torques. In a preferred embodiment, the speed limitations are implemented as instruction in a computer program, so that speed limitations, which might have been changed, can be executed quickly. The speed limitations in the module control unit do not need to be the same speed limitations as in the motor controls. The latter serve to protect the machine. The speed limitations in the module control unit, in contrast, can serve to control the energy storage module in a particularly effective speed range. The upper/lower speed limitations in the module control unit are thereby values, which are not higher/lower than the upper/lower speed limitations in the motor controls. In this embodiment, the speed limitations or maximum torques, respectively, and currents in the motor controls are considered by the module control unit when calculating the prespecified torques, which are to be transmitted.

In a further embodiment, the energy storage module comprises one or more measuring units for continuously measuring the voltage quality of the external voltage grid or systems. By monitoring the voltage grid by means of the continuous measurement, the energy storage module can actively disconnect the energy storage module from the respective external voltage grid in response to exceeding or falling below predetermined threshold values in the external voltage grid or systems. The measuring units can thereby be integrated in the local and/or non-local external voltage grid or can be arranged at one or more locations at the local external voltage supply network. The measuring units can also be arranged at connecting points between the energy storage module and the local and/or non-local external voltage grids. Measuring units in the context of the instant invention are, for example, measuring probes for measuring the line frequency and line voltage as example for relevant data for the connected local power supply system. Further measured values are, for example, the voltage course as function of the time, the phase angle, the neutral point, the line frequency, the line current and other variables. In the context of the instant invention, the person of skill in the art can select suitable measuring units or measuring probes and can arrange them at the suitable position. For example, if the desired line frequency of an external AC grid is 50 Hz and if the measuring units determine a drop of the line frequency, the module control unit will automatically feed energy into the respective external AC grid on the basis of the currently measured line frequency (as measured relevant data) and of a reaction sequence stored in the module control unit, until the line frequency is at the desired value again. Further examples are the measuring of the phase angle in a local AC grid for providing a corresponding idle power compensation, or the voltage measuring in the case of a load decrease in the local external voltage grid, which is too high or too low, for maintaining voltage quality. Corresponding other reaction sequences are stored in the control for other control and system tasks.

In a further embodiment, the module control unit is designed to receive external data and to adapt the prespecified torques to the received external data. Such external data are preferably physical measured values, logical parameters, real time control commands or control commands for sequence control. The operating plan can be based, for example, on external data (control commands) relating to the localized and non-localized control and system tasks. The module control unit is furthermore able to react accordingly to changing conditions in the local external voltage grid and to increase or keep constant the line quality of the local external voltage grid by means of feeding energy or absorbing energy or to improve the line quality again in response to an interference in the local external voltage grid. The received external data (control commands), hereinbelow also identified as instructions, correspond to the localized and/or non-localized control and system tasks for the energy storage module, which are performed accordingly by the module control unit. The term "execute" hereby identifies the controlling of the energy storage module by means of the module control unit according to the control commands (external data), which are present, for the localized and non-localized control and system tasks for the connected power supply systems. The external data are transmitted by an external control unit, for example which controls the demand of control energy for the non-local alternating voltage network (power supply system), for example, and which can request this demand in the form of non-localized control and system tasks from the energy storage module via the communication network in the context of the free capacities of the energy storage module (not required for the localized control and system tasks). Further external systems, from which the energy storage module could receive non-localized control and system tasks, would be a power support group or an energy exchange, for example, by means of which energy feeds or energy decreases during certain operating times are correspondingly favorable. Further external variables for non-localized control and system tasks are, for example, the idle power demands, a peak load compensation or required local storage demand in the non-local AC grid (power supply system).

The term "receiving" denotes all types of processes, in response to which external data are transferred to the energy storage module. These external data are, for example, control commands, on the basis of which the module control unit controls the energy storage module. The external data are transmitted by external systems, for example control systems of the local AC grid (power supply system), a higher global control or local measuring points. These control commands (external data) comprise the localized and non-localized control and system tasks, which are performed by the energy storage module according to the invention within the scope of its possibilities. The external data (control commands), however, can also be received by a data medium via a data interface by being read in a corresponding data medium drive (for example a CD-ROM) or via a data medium interface (for example by a USB data stick). In the alternative, the external control commands can also be received by means of a direct input via a corresponding user interface (screen and keyboard).

In an embodiment, the energy storage module comprising corresponding interfaces is designed to transmit operating data, which were generated in the energy storage module according to the invention, to the external, so that the respective operating data in the external systems can form the basis for the control and system tasks, which are to be received there. The transmission, however, can also refer to the transmission of a test signal for examining an existing data connection.

To perform the control and system tasks, the module control unit comprises a priority management for executing the individual external data (control commands) in an embodiment, wherein the execution of the external control commands relating to localized control and system tasks in the local AC grid or systems (power supply systems) has priority over the execution of the external control commands relating to the non-localized control and system tasks in the non-local alternating voltage network (power supply system). The priority management can be embodied as data storage, which the module control unit accesses prior to executing the external control commands and which executes the next external control commands according to the given priorities. The priorities can thereby be stored on the data storage so as to be inalterable by external access. A change of the priorities can be possible, for example, by replacing the corresponding data storage or the corresponding file with the priority management on location in the energy storage module.

In response to an interfered of the external data (control commands) in a further embodiment, the module control unit is provided to have the module storage capacity and module output exclusively for performing localized control and system tasks in the connected local external voltage grid or systems (power supply systems) until the receipt of external data is possible again. To determine an interference of the data receipt, the module control unit can thereby periodically transmit test signals to the external and can process the lack of a corresponding return signal as verification of an interference of the reception. Such a test signal is a so-called digital handshake, for example, relating to the existence of the communication connection. The preference of localized control and system tasks is advantageous, because, after failure of the communication to the external, the module control unit no longer receives a return message relating to the current state of the non-local external voltage grid (power supply system). If the module control unit were to then simply process the tasks at hand without further external data (control signals), which are to be received, this could even lead to a failure of the external voltage grid (power supply system) as a result of overload in special situations. It is thus advantageous to perform only the localized control and system tasks, to which the energy storage module is obligated and which can monitor the usefulness of these localized tasks, if applicable by way of its own measuring units.

In a further embodiment, the module control unit is designed to detect, evaluate further operating data of the energy storage module in addition to the speed, and to transmit a messaging protocol comprising the operating data via one of the data interfaces to the external, for example to corresponding external control systems or external control units, from which the energy storage module receives the external data. With this, at least the operating data for the external data (control commands), which are to be received, can be considered in the external control system (or control units). The operating data of the energy storage module specify, for example, which module storage capacity and module output is present and which (current) free non-local capacity (the module storage capacity, which is not required for the localized control and system tasks) and (current) free non-local power (the module output, which is not required for the localized control and system tasks) the energy storage module has for non-localized tasks and/or which localized control and system tasks are planned in the future. The operating data can thereby be measured by the module control unit itself via operating sensors, or the operating data are transmitted by other modules via corresponding data lines. The operating data detected in this manner are evaluated by the module control unit according to a procedure stored in the module control unit, for example by means of a corresponding software program, and are transmitted as operating data in a predetermined format via the above-described data interfaces. The transmissions of the operating data takes place every second, for example, as required by the application. The module control unit detects for example the actual values of the storage states of the individual flywheel storage units, the states of the connected power supply systems (for example voltage and current) and calculates this data to perform the localized and non-localized control and system tasks. In addition to the operating data, the messaging protocol can comprise for example the identity of the energy storage module in the form of a characteristic name, such as an identification number and possibly the location, at which the energy storage module is set up, in the form of geo-coordinates. The messaging protocol thereby has a suitable data format, for example encrypted, so as to be able to be received and processed by the desired external locations. The transmitted operating data including the information relating to actual and planned data of free module storage capacities and free module outputs can then be received, decrypted and planned accordingly by an external master control (or external control unit) and corresponding plant-specific non-localized or localized control and system tasks in the form of external data (control commands) can subsequently be transmitted back to the energy storage module.

In a further embodiment, the energy storage module furthermore comprises auxiliary units for operating the flywheel storage units, and the module control unit is designed to adapt a control of the auxiliary units to received internal operating data or external data. The internal operating data thereby preferably comprise thermal loads within the energy storage module, such as of the flywheel storage units or of further module-internal systems. Further module-internal systems are, for example, a vacuum system, a heating or cooling system or other supply systems. The efficiency of the energy storage module is increased therewith. The internal electrical losses can be minimized by means of specifically influencing the operating behavior or of the operating point of the auxiliary units as a function of plant-internal or external current measured values. For example, the flow temperature of a cooling unit as an example of an auxiliary unit can be increased or lowered, depending on current internal/external loads. For example, a reduced waste heat of the flywheel storage units can be used to reduce the cooling capacity of the cooling unit, which saves operating energy for the cooling unit. In another example, the output of a vacuum pump can be operated in a clocked manner or can be turned off completely as a function of the internal pressure of the energy storages to generate an operating vacuum in the flywheel energy storages. Such measures save operating energy and thus increase the efficiency and thus make it possible to provide a more effective energy storage module.

In a further embodiment, the energy storage module additionally comprises one or more power sinks, which are connected to the auxiliary units. A further absorption of additional energy is made possible therewith when the flywheel storage units are charged completely. For example, the capacity of the energy storage module for absorbing an external electrical power (for example primary or secondary control power from one of the AC grids) can be increased by using a cooling system comprising a primary and secondary cooling circuit in a well-directed manner in that the secondary cooling circuit of the cooling system is simultaneously cooled and electrically heated by means of the primary circuit, for example by means of an immersion heater in the storage container as first power sink, which results in an increased cooling efficiency of the primary cooling circuit (increased power consumption of the cooling machine as second power sink). The increase of the module storage capacity beyond the nominal sum of the unit storage capacities of the individual flywheel storage units can be increased deliberately beyond the extent required for a normal operation, depending on the environmental conditions or system operating point by means of the (electrical) power consumption of cooling system and/or vacuum system. A coolant quantity, which is held available in this manner, or the vacuum level below a nominal vacuum, which is reached additionally, respectively, can be recalled at a later point in time by means of non-operated auxiliary units and the associated saving of operating energy and can thus be saved, if there is an increased demand.

BRIEF DESCRIPTION OF THE ILLUSTRATIONS

Figure 2:
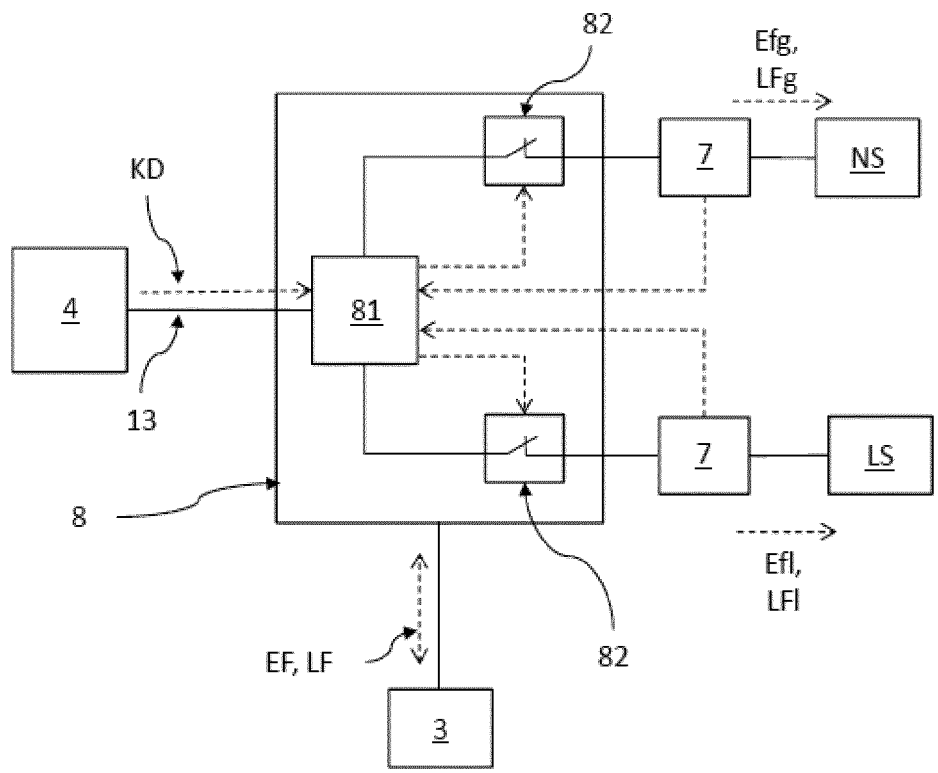
Figure 3:
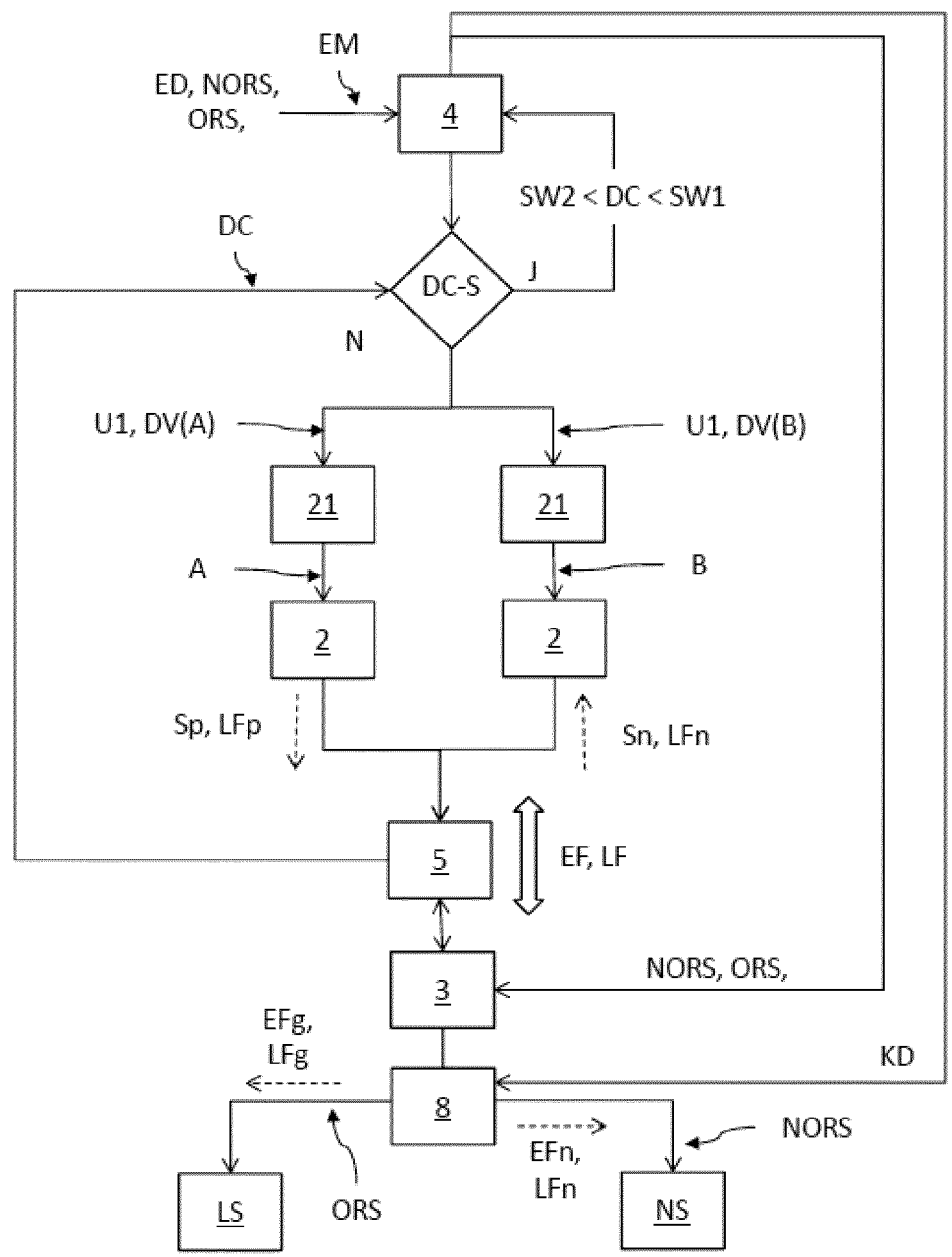
Figure 4:
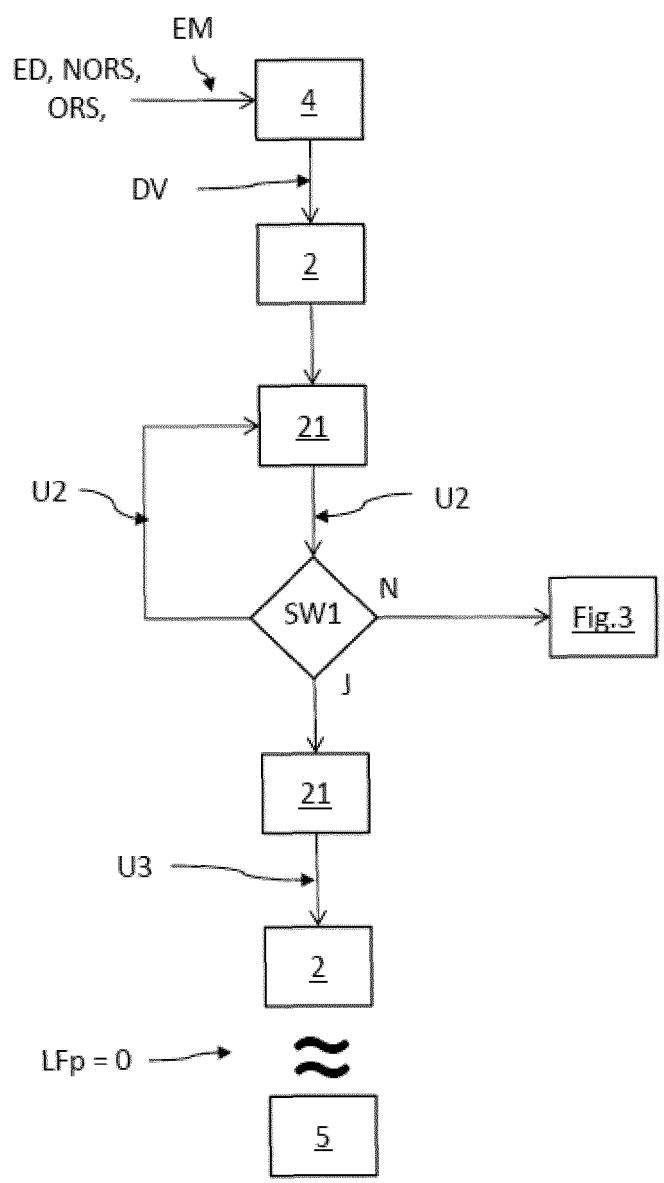

These and other aspects of the invention will be shown in detail in the illustrations as follows:

FIG. 1: an embodiment of the energy storage module according to the invention;

FIG. 2: an embodiment of the control system comprising control box;

FIG. 3: an embodiment of the method according to the invention for operating the energy storage module;

FIG. 4: a further embodiment of the method according to the invention for operating the energy storage module;

DETAILED DESCRIPTION OF THE EXEMPLARY EMBODIMENTS

FIG. 1 shows an embodiment of the energy storage module 1 according to the invention for reversibly storing electrical energy in the form of mechanical rotation energy, which comprises four flywheel storage units 2 herein, comprising respective unit storage capacities EK and unit outputs EL. This small number was chosen for the sake of clarity in the schematic illustration. For the real application, an energy storage module comprises for example thirty flywheel storage units 2. In this design, a maximum storage capacity of 150 kWh and a maximum output of 0.6 MW per energy storage module would follow with the above-listed individual capacities for each flywheel energy storage. Each of the flywheel storage units 2 comprises an electromagnetic transducer 23, which is connected electrically to the DC voltage intermediate circuit 5 via a motor control 21, preferably a frequency converter 21. The DC voltage intermediate circuit 5 serves the purpose that all of the flywheel storage units 2 can be connected parallel to one another electrically, so that the unit storage capacities EK and unit outputs EL can add up to a module storage capacity MSK and module output ML and that a faulty flywheel storage unit does not question the operational reliability of the entire energy storage module 1. The DC voltage intermediate circuit is connected to a control system 3 with the output side 31 thereof. The input side 32 of the control system 3 is connected to an external local voltage grid LS and to a non-local voltage grid NS. The module control unit 4 controls the energy storage module 1 by prespecified torques DV (preferably time-related prespecified torques), which the module control unit 4 generates and transmits U1 to the flywheel storage units 2 in response to the operation of the energy storage module 1 U1. Due to the prespecified torques DV, the flywheel storage units 2 feed energy in the form of electricity into the DC voltage intermediate circuit 5 or remove energy in the form of electricity from the DC voltage intermediate circuit 5. The control system 3 hereby controls the DC voltage DC in the DC voltage intermediate circuit 5 by emitting (Ep) energy into at least one of the two external voltage grids LS, NS or by absorbing En energy from at least one of the two external voltage grids LS, NS between an upper threshold value SW1 (nominal DC voltage +5 V) and a lower threshold value SW2 (nominal DC voltage −5 V) in such a manner that the DC voltage DC remains substantially constant at a value of 750 V, for example. In this embodiment, a further control system 3' as additional control system 3' is connected to the DC voltage intermediate circuit 5 parallel to the original control system 3 in addition to the control system 3, which keeps the DC voltage DC constant in the DC voltage intermediate circuit 5 between the upper and lower threshold values SW1, SW2 (original control system). This additional control system 3' is connected here to a further local voltage grid LS', wherein the local power supply system LS' represents an isolated network, e.g., which is not connected to the other power supply systems LS, NS, for example a power supply system for a building. The additional control system 3' thus performs an isolated operation (isolated control or isolated supply, respectively) for the isolated network LS'. This has the advantage that the original control system 3 can maintain and execute the connection conditions of the external voltage grids LS, NS without limitations, while the additional control system 3', e.g., can execute grid codes for the isolated network LS', which differ therefrom. For performing the localized control and system tasks ORS in the isolated network LS', the module control unit 4 is connected to the additional control system 3' via a data line 13 (dashed arrow). For the control, the module control unit 4 recalls the speeds DZ of the individual flywheel storage units 2 from the motor control 21 thereof and determines a respective current charge state of the individual flywheel storage units 2 from the recalled speed DZ. For machine protection reasons, an upper speed limitation and/or a lower speed limitation are implemented in the respective motor controls 21 of the flywheel storage units 2, wherein the speed limitations are implemented herein by means of a component 22. In the alternative or additionally, the speed limitations can also be implemented in the module control unit 4. Preferably, the speed limitations in the module control unit 4 are implemented in a computer program as instructions. The lower speed limitation is minimally 0 revolutions/s, wherein it can be technically sensible to select a higher minimum speed, so that the motor system can supply a minimum output, which is necessary for operational reasons. Towards the top, the speed is limited either by the motor converter frequency or is limited by the stabilities of the rotor components. Maximum speeds of 800 Hz, for example, are typical.

The module control unit 4 controls the energy storage module 1 based on localized and non-localized control and system tasks ORS, NORS, which are executed in the respective local and non-local AC grids LS, NS. The module control unit 4 receives EM the localized and non-localized control and system tasks ORS, NORS in the form of external data ED via a data interface 11. The prespecified torques DV, which are to be transmitted to the flywheel storage units 2, are generated by the module control unit 4 on the basis of the received EM external data ED. External Data ED are, for example, localized and non-localized control and system tasks, physical measured values, logical parameters, real time control commands or control commands for sequence control. The module control unit 4 furthermore comprises a storage 41 for storing the external data ED, in particular the localized and non-localized control and system tasks ORS, NORS. In addition, the module control unit 4 comprises a priority management 42 here. To control the energy storage module 1, the module control unit 4 prepares an operating plan BP for performing the localized and non-localized control and system tasks ORS, NORS in the connected local and non-local voltage grids LS, NS and transmits corresponding prespecified torques DV to the respective flywheel storage units 2. Preferably, the prespecified torques DV are adapted individually to the respective charge states of the individual flywheel storage units 2. So that the module control unit 4 always receives current external data ED for controlling the energy storage module 1, the module control unit 4 in this embodiment examines the existing communication connection to the external with regard to its operational reliability by emitting a test signal TS, as a result of which an external system transmits a corresponding return signal RS back. The receipt EM of the return signal proves the operational reliability of the communication connection to this external system, from which the energy storage module receives for example its localized and non-localized control and system tasks ORS, NORS, which are to be performed, as external data ED. So that these external data ED consider the current state of the energy storage module 1, the module control unit 4 sends the operating data BD of the energy storage module 1 for example periodically to the external system. The operating data BD can thereby comprise the charge states of the flywheel storage units 2 and thus the current module storage capacity MSK and module output, which is available on principle, the identity of the energy storage module 1 or also the state of other components of the energy storage module 1.

So that the energy and power flow EF, LF, which flows in or from the DC voltage intermediate circuit 5 to/from the AC grids, can be divided suitably for the respective local and non-local AC grids LN, NS to fulfill the respective localized control and system tasks ORS in the local AC grid LS and the non-localized control and system tasks NORS in the non-local AC grid NS, the energy storage module 1 comprises a control box 8, which divides the total energy and power flow EF, LF arriving from the DC voltage internal circuit 5 into a local energy and power flow EFl, LFl for the local AC grid LS and a non-local energy and power flow EFg, LFg for the non-local AC grid NS. To optimally execute the control and system tasks ORS, NORS in the connected AC grids LS, NS, the energy storage module 1 comprises a measuring unit 7 for continuously measuring the voltage quality or the AC grid or systems LS, NS, which measures the relevant data for assessing the voltage quality in the AC grids LS, NS. More than one measuring units 7 can also be used in other embodiments. Suitable measured values for receiving the relevant data RD are, for example, the voltage curve as function of the time, the phase angle, the neutral point, the line frequency or the line current. In the context of the instant invention, the person of skill in the art can select suitable measuring units or measuring probes and can arrange them at the suitable position. The energy storage module 1 can thus actively disconnect the connection to an alternating voltage network LS, NS in response to exceeding predetermined threshold values in the AC grid or systems LS, NS.

The energy storage module 1 furthermore comprises auxiliary units 91, 92 for operating the flywheel storage units 2, such as, for example, a vacuum system 91, which is connected to the rotor containers for the rotors (flywheel masses) in the flywheel storage units 2 via a pipe system (not illustrated here for the sake of clarity), so as to generate the vacuum of less than $10^{-3}$ mbar, for example, which is required in the case of high speeds, at speeds of more than 40000 U/min in the rotor containers. A further auxiliary unit is a cooling unit 92 for discharging operating heat from the energy storage module 1. The module control unit 4 is designed to adapt the control of the auxiliary units 91, 92 to received internal operating data BD or external data ED, the auxiliary units 91, 92 are thus connected to the module control 4 via data lines 13. The internal electrical losses can be minimized by means of specifically influencing the operating behavior or the operating point of the auxiliary units 91, 92 as a function of plant-internal or external current measured values. For example, the flow temperature of a cooling unit 92 as an example of an auxiliary unit can be increased or lowered, depending on current internal/external loads. For example, a reduced waste heat of the flywheel storage units 2 can be used to reduce the cooling capacity of the cooling unit 92, which saves operating energy for the cooling unit 92. In another example, the output of a vacuum pump in the vacuum module 91 can be operated in a clocked manner or can be turned off completely as a function of the gas release behavior of the flywheel masses (rotors) for generating an operating vacuum in the rotor containers for the rotors of the flywheel energy storages 2. Such measures save operating energy and thus increase the efficiency by up to 10% and thus make it possible to provide a more effective energy storage module 1. For the sake of clarity, the supply of the auxiliary units 91, 92 with operating current is not illustrated in FIG. 1.

In this embodiment, the energy storage module 1 additionally comprises a power sink 6, which is connected to the auxiliary units 91, 92 (illustrated in black). A further absorption of additional energy is made possible by means of the power sink 6 when the flywheel storage units 2 are charged completely. For example, the module storage capacity MSK of the energy storage module 1 for absorbing an external electrical power (for example primary or secondary control power from one of the AC grids NS) can be increased by using a cooling system 92 comprising a primary and secondary cooling circuit in a well-directed manner in that the secondary cooling circuit of the cooling system 92 is heated electrically, for example by means of an immersion heater in the coolant storage container, for example comprising a 400 l volume (for example a water tank) as first power sink 6, which results in an increased cooling efficiency of the primary cooling circuit (increased power consumption of the cooling machine 92 as second power sink). The increase of the module storage capacity MSK beyond the nominal sum of the unit storage capacities EK of the individual flywheel storage units 2 can be increased deliberately beyond the extent required for a normal operation, depending on the environmental conditions or system operating point by means of the (electrical) power consumption of cooling system 92 and/or vacuum system 91. The coolant quantity, which is stored in this manner, or the vacuum level below a nominal vacuum, which is reached additionally, respectively, can be recalled at a later point in time by means of non-operated auxiliary units 91, 92 and the associated saving of operating energy and can thus be saved, if there is an increased demand.

To control the energy storage module 1, the module control unit 4 and the individual components of the energy storage module 1 are connected to one another via data lines 13, for example a data bus 13. The module control unit 4 transmits the configuration data KD relating to the control function of the control box 8 to the control system 3 via the data line 13.

FIG. 2 shows an embodiment of the control box 8. So that the energy and power flow EF, LF between the connected AC grids (power supply systems) LS, NS and the energy storage unit 1 can be divided according to the control and system tasks ORS, NORS, the energy storage module 1 in this embodiment comprises a control box 8 comprising a control element 81 and separate disconnectors 82 for each of the connected AC grids (power supply systems) LS, NS. The module control unit 4 is connected to the control element 81 of the control box 8 via a data connection 13 and transmits corresponding configuration data of the controller function KD to the control box 8, here directly to the control element 81, for controlling the energy and power flows. Due to the configuration data of the controller function KD, the control element 81 controls the distribution of the energy and power flow EF, LF, arriving from the DC voltage intermediate circuit 5, to the connected AC grids (power supply systems) LS, NS as energy flow EFl for the local AC grid (local power supply system) LS and as energy flow EFg for the non-local AC grid (non-local power supply system) NS. In this exemplary embodiment, the distribution of the energy flow EF is shown only in an exemplary manner in response to feeding energy into both connected AC grids (power supply system) LS, NS. The control box 8 is also designed to control an energy flow from one of the connected alternating current or DC networks (power supply systems) LS, NS and an energy flow into the other connected alternating current or DC voltage network (power supply system) NS, LS, wherein, depending on the size of the two energy flows, either the negative energy excess is stored by the energy storage system 1 or the positive energy excess is provided by the energy storage system 1. The energy storage system 1 is not shown explicitly here, but is illustrated only symbolically via the corresponding components. The control box 8 simultaneously receives the relevant data RD from the two connected voltage grids (power supply systems) LS, NS, from which the control element 81 derives the presence of the two connected voltage grids (power supply systems) LS, NS by means of the criteria or threshold values stored in the control element 81 for the relevant data RD. If one or both of the connected voltage grids (power supply systems) LS, NS should no longer be available due to a power failure, the failure of the respective voltage grid (power supply system) LS, NS manifests itself in the corresponding relevant data RD, which are transmitted to the control element 81, in response to which the control element 81 automatically transmits corresponding separation instructions (dashed arrow) to the respective disconnector or disconnectors 82 for disconnecting the energy storage system 1 from the connected AC grid or systems (power supply systems) LS, NS, in response to which the disconnector or disconnector(s) 82 disconnects the formerly connected alternating current voltage networks (power supply systems) LS, NS from the energy storage system 1. The disconnection of the connected alternating current voltage network thereby occurs within a few milliseconds. In response to the disconnection from only one alternating current voltage network, the energy storage system 1 still remains operational for the other alternating current voltage networks, which are still connected. In response to a failure of an alternating current voltage network, a short-circuit or an overload situation can be prevented effectively. The exemplary embodiment shown herein comprising a connected local alternating current voltage network (local power supply system) LS and a connected non-local alternating current voltage network (non-local power supply system) NS is only an example for two connected alternating current voltage networks (power supply systems). In other embodiments, the control box 8 can also be connected to more than two alternating current voltage networks (power supply systems). The two or more connected alternating current voltage networks (power supply systems) can also be local alternating current voltage networks in each case (local power supply systems), of which at least one of the local alternating current voltage networks (local power supply systems) is connected to the non-local alternating current voltage network (non-local power supply system) for performing the non-localized control and system tasks NORS.

FIG. 3 shows an embodiment of the method according to the invention for operating the energy storage module 1. The module control unit 4 receives localized and non-localized control and system tasks ORS, NORS as external data ED and examines, whether the DC voltage DC of the DC voltage intermediate circuit 5 corresponds to the DC nominal value DC-S. If this is so (DC-S="J" corresponds to SW2<DC<SW1) and if no other control and system tasks are present for feeding energy or removing energy in/from the connected alternating current voltage networks LS, NS, there is no need for the module control unit 4 to transmit prespecified torques DV to the flywheel storage units. If the DC voltage DC exceeds the nominal DC voltage (DC-S="N"), a prespecified torque DV for accelerating B the flywheels storage units 2 is transmitted U1 by the module control unit 4 to the flywheel storage units 2 in response to an energy flow EFp from the alternating current voltage networks LS, NS into the DC voltage intermediate 5. If the DC voltage DC falls below the nominal DC voltage (DC-S="N"), a prespecified torque DV for braking A the flywheel storage units 2 is transmitted by the module control unit 4 to the flywheel storage units 2 in response to an energy flow EFn from the DC voltage intermediate circuit 5 into the alternating current voltage network LS, NS. According to the configuration data for the control function KD, which it receives from the module control unit 4, the control box 8 controls the energy and power flows EF, LF, which it receives from the control system 3, into the energy and power flows EFl, LFl and EFg, LFg for respective alternating current voltage networks LS, NS according to the shares of the localized and non-localized control and system tasks ORS, NORS.

FIG. 4 shows a further embodiment of the method according to the invention for operating the energy storage module 1. The module control unit 4 receives EM localized and non-localized control and system tasks ORS, NORS as external data ED and transmits corresponds prespecified torques DV to the flywheel storage units 2. In the meantime, the motor controls 21 of the individual flywheel storage units 2 monitor U2 the DC voltage DC in the DC voltage intermediate circuit 5 continuously against the upper threshold value SW1, which is illustrated by the closed arrow circle U2. No later than in response to exceeding the upper threshold value SW1 (SW1="J"), the motor controls 21 of all of the flywheel storage units 2 prevent U3 any power flow LFp from the energy storage units 2 into the DC voltage intermediate circuit 5 (illustrated as wavy lines between small box "2" and small box "5"). In the alternative, the above examinations can also be carried out by the control system 3. The follow-up actions as a result of a threshold value violation remain the same as described above. If the DC voltage DC in the DC voltage intermediate circuit 5 is within the nominal range S-DC or again within the nominal range, the energy storage module 1 is further operated in accordance with the control steps according to FIG. 3.

The embodiments shown herein only represent examples for the instant invention and are to thus not be understood to be limiting. Alternative embodiments considered by the person of skill in the art are likewise covered by the scope of protection of the instant invention.

LIST OF REFERENCE NUMERALS

1 energy storage module according to the invention
11 data interface(s)

12 measuring unit
13 data line, data bus
2 flywheel storage unit
21 motor control
22 component
23 electromagnetic transducer
3, 3' control system
31 output side
32 input side
4 module control unit
41 storage
42 priority management
5 DC voltage intermediate circuit
6 power sink
7 measuring unit
8 control box
81 control element
82 disconnector
91, 92 auxiliary units
A braking the flywheel storage units
B accelerating the flywheel control units
BD operating data
DC DC voltage in the DC voltage intermediate circuit
DC-S nominal value of the DC voltage in the DC voltage intermediate circuit
DZ speed
DV prespecified torque
ED external data
EF energy flow
EFg energy flow non-local voltage grid
EFl energy flow local voltage grid
EFn energy flow into the energy storage module or the flywheel storage units (negative energy flow)
EFp energy flow out of the energy storage module or the flywheel storage units (positive energy flow)
EK unit storage capacity
EL unit storage output
EM receipt of data
En absorbing energy from the voltage grid
Ep emitting energy into the voltage grid
GSB DC voltage support operation
KD configuration data
MSK module storage capacity
LF power flow
LFn power flow into the energy storage module or the flywheel storage units (negative power flow)
LFp power flow out of the energy storage module or the flywheel storage units (positive power flow)
LS, LS' local voltage grid (local power supply system)
NS non-local voltage grid (non-local power supply system)
RD relevant data
Sn removing energy/power from the DC voltage intermediate circuit
Sp feeding energy/power in the DC voltage intermediate circuit
SW1 upper threshold value for the DC voltage
SW2 lower threshold value for the DC voltage
RS return signal
TS test signal
U1 transmitting the prespecified torques
U2 continuous monitoring of the DC voltage in the DC voltage intermediate circuit
U3 preventing any power flow from the flywheel units into the DC voltage intermediate circuit

The invention claimed is:

1. An energy storage module for reversibly storing electrical energy in the form of mechanical rotation energy, comprising a plurality of flywheel storage units, at least one control system and at least one module control unit, wherein the flywheel storage units are connected electrically in parallel by means of a common DC voltage intermediate circuit and the at least one control system is connected to the common DC voltage intermediate circuit by way of an output side of the at least one control system and to at least one external voltage grid by way of an input side of the at least one control system, wherein the at least one module control unit is provided for transmitting suitable pre-specified torques to the flywheel storage units for emitting or absorbing energy to/from the common DC voltage intermediate circuit, and the at least one control system is designed to control a DC voltage in the common DC voltage intermediate circuit such that the DC voltage remains substantially constant between an upper threshold value and a lower threshold value when energy is emitted into the at least one external voltage grid and when energy is absorbed from the at least one external voltage grid, where the at least one control system is provided to control the energy flow between the connected at least one external voltage grid and the flywheel energy storage units in order to execute control and system tasks in the at least one external voltage grid in a manner provided by the at least one module control unit.

2. The energy storage module according to claim 1, wherein the at least one module control unit is provided to generate and transmit the pre-specified torques for the flywheel storage units in a time-related manner, in response to which the flywheel storage units feed or remove electricity in the common DC voltage intermediate circuit due to the time-related pre-specified torques.

3. The energy storage module according to claim 2, wherein each flywheel storage unit receives individual pre-specified torques from the at least one module control unit.

4. The energy storage module according to claim 1, wherein each of the flywheel storage units comprises an electromagnetic transducer, which is connected electrically to the common DC voltage intermediate circuit via a motor control, preferably a frequency converter.

5. The energy storage module according to claim 4, wherein the motor controls of all of the flywheel storage units are provided to continuously monitor the DC voltage in the common DC voltage intermediate circuit against the upper threshold value and to independently prevent any power flow from the flywheel storage units into the common DC voltage intermediate circuit no later than when the upper threshold value has been exceeded.

6. The energy storage module according to claim 4, wherein the at least one module control unit recalls current speeds of the individual flywheel storage units from the motor controls thereof and determines a respective current charge state of the individual flywheel storage units from the recalled speed.

7. The energy storage module according to claim 1, wherein an upper speed limitation and/or a lower speed limitation is implemented in the motor control of the flywheel storage units, the upper speed limitation and/or lower speed limitation is preferably implemented by means of a component, which is provided for this purpose.

8. The energy storage module according to claim 1, wherein upper speed limitations and/or lower speed limitations for the pre-specified torques are implemented in the at least one module control unit, and the speed limitations are implemented in a computer program as instructions.

9. The energy storage module according to claim 1, wherein the energy storage module comprises one or more measuring units for continuously measuring a voltage quality of the at least one external voltage grid.

10. The energy storage module according to claim 1, wherein the at least one module control unit is designed to receive external data and to adapt the pre-specified torques to the received external data, such external data are preferably physical measured values, logical parameters, real time control commands or control commands for sequence control.

11. The energy storage module according to claim 1, wherein the energy storage module furthermore comprises auxiliary units for operating the flywheel storage units and that the at least one module control unit is designed to adapt a control of the auxiliary units to received internal operating data or external data.

12. The energy storage module according to claim 11, wherein the energy storage module additionally comprises one or more power sinks connected to the auxiliary units.

13. A method for controlling an energy storage module for reversibly storing electrical energy in the form of mechanical rotation energy, comprising a plurality of flywheel storage units, at least one control system and at least one module control unit, wherein the flywheel storage units are connected electrically in parallel by means of a common DC voltage intermediate circuit and the at least one control system is connected to the common DC voltage intermediate circuit by way of an output side of the at least one control system and to at least one external voltage grid by way of an input side of the at least one control system, and the at least one control system is designed to control a DC voltage in the common DC voltage intermediate circuit such that the DC voltage remains substantially constant between an upper threshold value and a lower threshold value when energy is emitted into the at least one external voltage grid and when energy is absorbed from the at least one external voltage grid, where the at least one control system is provided to control the energy flow to the connected at least one external voltage grid in order to execute control and system tasks in the at least one external voltage grid in a manner provided by the at least one module control unit, comprising:
  transmitting a pre-specified torque for accelerating the flywheel control units by means of the at least one module control unit to the flywheel units in response to an energy flow from the at least one external voltage grid into the common DC voltage intermediate circuit or;
  transmitting a pre-specified torque for braking the flywheel storage units by means of the at least one module control unit to the flywheel storage units in response to an energy flow from the common DC voltage intermediate circuit into the at least one external voltage grid or; and
  no transmission of pre-specified torques for the flywheel storage units in response to no energy flow into or from the common DC voltage intermediate circuit.

14. The method according to claim 13, wherein each of the flywheel storage units is electrically connected to the common DC voltage intermediate circuit via a motor control, preferably a frequency converter, further comprising:
  continuously monitoring the DC voltage in the common DC voltage intermediate circuit against the upper threshold value by the motor controls of all of the flywheel storage units; and
  independently preventing any power flow from the flywheel storage units into the common DC voltage intermediate circuit no later than when the upper threshold value of the DC voltage has been exceeded in the common DC voltage intermediate circuit by the motor controls of all of the flywheel storage units.

15. The energy storage module according to claim 1, wherein the energy storage module is connected to more than one external voltage grids by the input side of the at least one control system.

16. The energy storage module according to claim 15, wherein the more than one external voltage grids comprises an AC distribution grid.

17. The energy storage module according to claim 15, further comprising a control box comprising a control element and separate disconnectors for each of the connected more than one external voltage grids, where the control element controls a distribution of energy and power flow arriving from the common DC voltage intermediate circuit to the connected more than one external voltage grids.

18. The energy storage module according to claim 17, wherein the at least one module control unit is connected to the control element of the control box via a data connection to transmit corresponding configuration data of a controller function to the control box for controlling the energy and power flows.

19. The energy storage module according to claim 18, wherein the control box is also designed to control the energy flow from one of the connected more than one external voltage grids and the energy flow into the other connected more than one external voltage grids, where depending on a size of the energy flow from the one of the connected more than one external voltage grids on a size of the energy flow into the other connected more than one external voltage grids either a negative excess of the energy flow is stored in the energy storage module or a positive excess of the energy flow is provided by the energy storage module.

20. The method according to claim 13, wherein the energy storage module is connected to more than one external voltage grid by the input side of the at least one control system.

21. The method according to claim 20, wherein the more than one external voltage grid comprises an AC distribution grid.

22. The method according to claim 20, wherein the energy storage module further comprises a control box comprising a control element and separate disconnectors for each of the connected more than one external voltage grids, the method further comprises controlling a distribution of energy and power flow arriving from the common DC voltage intermediate circuit to the connected more than one external voltage grids by the control element.

23. The method according to claim 22, wherein the at least one module control unit is connected to the control element of the control box via a data connection, the method further comprises transmitting corresponding configuration data of a controller function to the control box for controlling the energy and power flows.

24. The method according to claim 23, wherein the control box is also designed to control the energy flow from one of the connected more than one external voltage grids and the energy flow into the other connected more than one external voltage grids, further comprising depending on a size of the energy flow from the one of the connected more than one external voltage grids and on a size of the energy flow into the other connected more than one external voltage grids either storing a negative excess of the energy flow in the energy storage module or providing a positive excess of the energy flow by the energy storage module.

\* \* \* \* \*